Figure 1A:
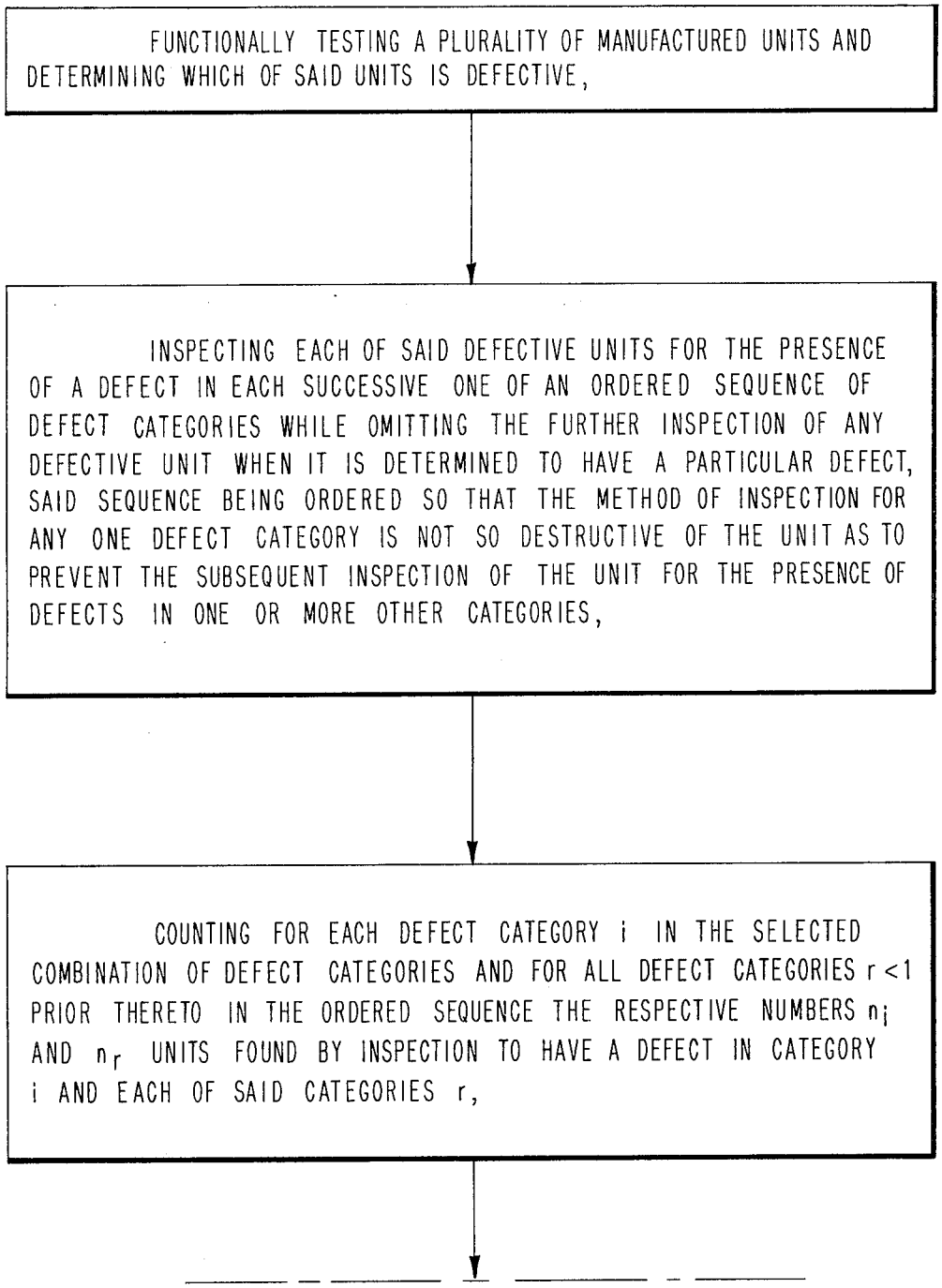

United States Defensive Publication [19] (H) [11] T959,005

Froot et al. [43] June 7, 1977

[54] METHOD OF DETERMINING YIELD LOSS DUE TO A COMBINATION OF DEFECTS IN MANUFACTURING METHOD UTILIZING SAME

[76] Inventors: Howard A. Froot, Bykenhulle Road, Hopewell Junction, N.Y. 12533; Vijendra P. Singh, Lakeview Road, Poughkeepsie, N.Y. 12603

[21] Appl. No.: 732,565

[22] Filed: Oct. 15, 1976

Related U.S. Application Data

[63] Continuation of Ser. No. 441,728, Feb. 11, 1974, abandoned, which is a continuation of Ser. No. 268,382, July 3, 1972, abandoned.

[51] Int. Cl.[2] ..... G06F 15/46

[52] U.S. Cl. ..... 235/151.13; 444/1

[57] ABSTRACT

A method of inspecting defective manufactured units and determining for any selected combination of defect categories the respective probable number of units having only a defect in each category of the selected combination of categories, and also the yield loss due to the selected combination of categories. The defect categories are arranged in an ordered sequence. Each unit of a sample of the manufactured units is inspected for the presence of a defect in each successive one of the ordered sequence of defect categories. As soon as it is determined that an inspected unit has a defect in a particular category, all further inspection of the unit is omitted and the unit is not inspected for the presence of defects in the subsequent categories of the sequence. From the resulting data there is determined for the selected combination of defect categories the respective probable number of units having only a defect in each category of the selected combination of categories and no defect in other categories. There is also determined for the selected combination of categories of defects the yield increase that may be expected by a change in the manufacturing process to eliminate the manufacture of any units having defects in the selected combination of categories. A manufacturing method utilizing this inspection method and the yield determinations is also disclosed.

5 Claims, 2 Sheets Drawing,

33 Pages Specification

The file of this unexamined application may be inspected and copies thereof may be purchased (849 O.G. 1221, Apr. 9, 1968).

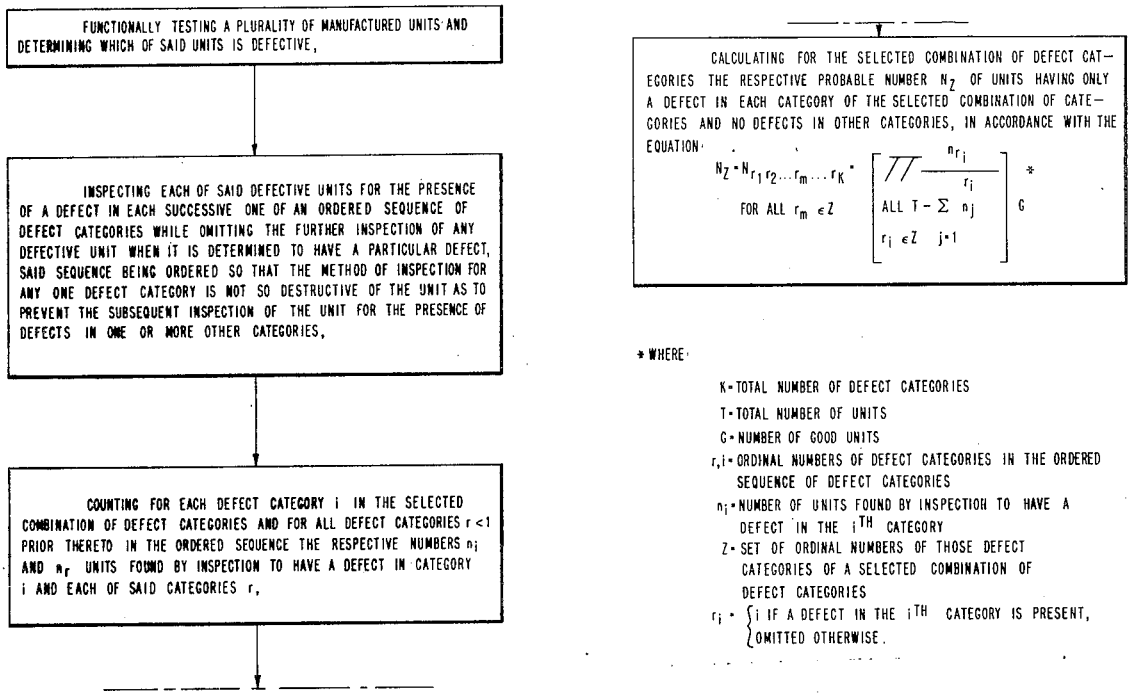

CALCULATING FOR THE SELECTED COMBINATION OF DEFECT CATEGORIES THE RESPECTIVE PROBABLE NUMBER $N_Z$ OF UNITS HAVING ONLY A DEFECT IN EACH CATEGORY OF THE SELECTED COMBINATION OF CATEGORIES AND NO DEFECTS IN OTHER CATEGORIES, IN ACCORDANCE WITH THE EQUATION:

$$N_Z = N_{r_1 r_2 \ldots r_m \ldots r_K} = \left[ \prod_{\substack{\text{ALL } r_i \in Z}} \frac{n_{r_i}}{T - \sum_{j=1}^{r_i} n_j} \right] * G$$

FOR ALL $r_m \in Z$

* WHERE:

K = TOTAL NUMBER OF DEFECT CATEGORIES

T = TOTAL NUMBER OF UNITS

G = NUMBER OF GOOD UNITS r, i = ORDINAL NUMBERS OF DEFECT CATEGORIES IN THE ORDERED SEQUENCE OF DEFECT CATEGORIES $n_i$ = NUMBER OF UNITS FOUND BY INSPECTION TO HAVE A DEFECT IN THE $i^{TH}$ CATEGORY

Z = SET OF ORDINAL NUMBERS OF THOSE DEFECT CATEGORIES OF A SELECTED COMBINATION OF DEFECT CATEGORIES $r_i = \begin{cases} i & \text{IF A DEFECT IN THE } i^{TH} \text{ CATEGORY IS PRESENT,} \\ \text{OMITTED} & \text{OTHERWISE.} \end{cases}$

FIG. 1B